United States Patent [19]
Hsieh et al.

[11] Patent Number: 6,078,373
[45] Date of Patent: Jun. 20, 2000

[54] COLOR LCD WITH MICROCOMPENSATORS

[75] Inventors: Ting-Chiang Hsieh; Chen-Lung Kuo, both of Hsinchu, Taiwan

[73] Assignee: Industrial Technology Research Institute, Hsin-Chu, Taiwan

[21] Appl. No.: 09/262,306

[22] Filed: Mar. 4, 1999

Related U.S. Application Data

[62] Division of application No. 08/742,102, Oct. 31, 1996, Pat. No. 5,929,955.

[51] Int. Cl.$^7$ ............... G02F 1/1333; G02F 1/1335
[52] U.S. Cl. ............... 349/106; 349/110; 349/117; 349/119
[58] Field of Search ............... 349/106, 110, 349/117, 119

[56] References Cited

U.S. PATENT DOCUMENTS

| | | | |
|---|---|---|---|
| 4,632,514 | 12/1986 | Ogwasa et al. | 350/339 |
| 5,136,405 | 8/1992 | Wada et al. | 359/53 |
| 5,380,459 | 1/1995 | Kanemoto et al. | 252/299.01 |
| 5,402,141 | 3/1995 | Haim et al. | 345/88 |
| 5,499,126 | 3/1996 | Abileah et al. | 359/68 |

OTHER PUBLICATIONS

L. Koo et al, "Crucial Influences of K33/K11 Ratio on Viewing Angle of Display Modeusing a Bend–Alignment Liquid–Crystal Cell with a Compensator", Applied Physics Letters vol. 68, Mar. 1996, pp. 1461–1463.

T. Miyashito et al. "Wide–Viewing Angle Modelsing Bend–Alignment Liquid Crystal Cell", Jpn–Journal Appl. Phys. vol. 34. Feb. 1995, PL1777–L179.

*Primary Examiner*—William L. Sikes
*Assistant Examiner*—Julie Ngo
*Attorney, Agent, or Firm*—George O. Saile; Stephen B. Ackerman

[57] ABSTRACT

Prior art solutions to liquid crystal birefringence (which causes the emergent light to become elliptically polarized) have involved use of a single birefringent layer (macrocompensator) to compensate for this. This approach is only partly successful. The present invention improves the color balance still further by providing a separate set of microcompensators for each primary color of the display. The microcompensators are first formed on one of the two substrates' inner surfaces, with the appropriate color filter being then formed directly over each one. By this means, an exact match between the color distortion introduced by the liquid crystal layer and the phase compensation needed to correct this can be made for each primary color separately.

3 Claims, 4 Drawing Sheets

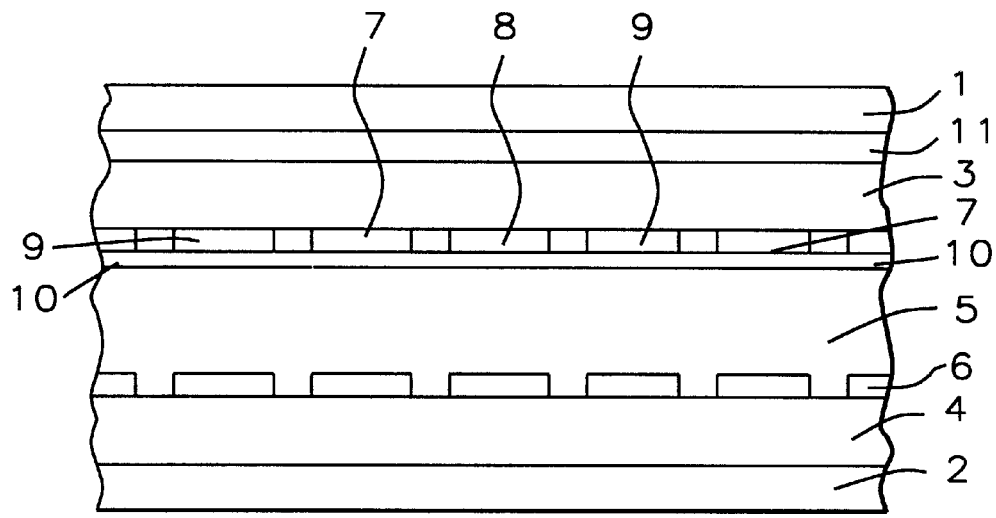
FIG. 1 – Prior Art
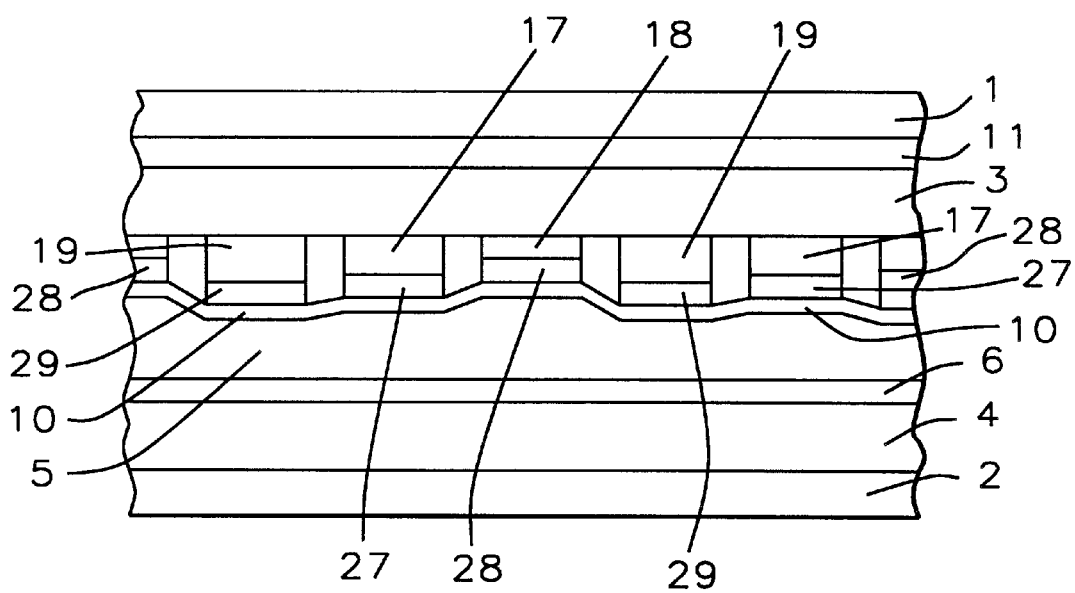
FIG. 2

COLOR LCD WITH MICROCOMPENSATORS

This is a division of patent application Ser. No. 08/742,102, filing date Oct. 31, 1996, Color Lcd With Microcompensators now U.S. Pat. No. 5,929,955, assigned to the same assignee as the present invention.

BACKGROUND OF THE INVENTION (1) Field of the Invention

The invention relates to the general field of Liquid Crystal Displays, particularly color balance in the emergent light.

(2) Description of the Prior Art

Referring to FIG. 1, the basic parts of a liquid crystal display are schematically illustrated in cross-section. A number of layers are involved, the outermost being a pair of crossed polarizers 1 and 2. In their most commonly used configuration, the polarizers are arranged so as to have their optic axes orthogonal to one another. That is, in the absence of anything else between them, light passing through the entrance polarizer would be blocked by the exit polarizer, and vice versa.

Below the entrance polarizer 1 is an upper transparent insulating substrate 3 (usually glass) and immediately above the exit polarizer 2 is a similar lower substrate 4. Conducting lines, such as 6, running orthogonal to, and insulated from, one another are located on the upper (inward-looking) surface of 4. Said orthogonal lines are connected at their intersections, optionally through Thin Film Transistors (TFTs). This allows voltage, separately applied to a pair of orthogonal lines, to be added together only at the intersecting position which will overlie a given pixel (or sub-pixel) of the display.

Sandwiched between, and confined there by means of suitable enclosing walls (not shown), is a layer of liquid crystal 5. Liquid crystals comprise long thread-like molecules whose orientation, relative to a given surface can be controlled by coating such a surface with a suitable orientation layer (not shown) and rubbing said orientation layer in the desired direction just prior to bringing it into contact with the liquid crystals.

Thus, in FIG. 1, the molecules closest to upper substrate 3 might be oriented so as to lie in the plane of the figure while the molecules closest to lower substrate 4 would be oriented to lie perpendicular to this plane. Molecules in between the two sets of pre-oriented molecules then arrange themselves so as to gradually change their orientation between these two extremes. Hence the term 'twisted nematic' (TN) for such a configuration. A TN is optically active and will rotate the plane of any polarized light that traverses it.

Thus, polarized light that was formed and oriented as a result of passing through entrance polarizer 1 will be rotated though an angle (for example 90°) after traversing layer 5 and so will be correctly oriented to pass through the exit polarizer 2. Such a device is therefore normally on (transmits light).

An important property of TN is that, in the presence of an electric field (typically about 1,000 volts/cm.), normal to the molecules, said molecules will all orient themselves so as to point in the same direction and the liquid crystal layer will cease to rotate the plane of polarization. As discussed above, a single pair of orthogonal lines comprise one electrode for generating said electric field, the other being transparent conducting common electrode 10, comprising indium-tin-oxide (ITO).

Besides the TN structure, there is another possible configuration wherein all molecules of liquid crystal 5 (in FIG. 1) are oriented to lie in the plane of the figure but the inclination of each is different. The molecules closest to upper substrate 3 might be inclined 'right up and left down' while the molecules closest to lower substrate 4 would be inclined 'left up and right down'. These inclination angles (7° in our example) can be controlled by selecting the orientation layer. Molecules in the middle position between upper and lower substrates might be perpendicular in the presence of the electric field. Other molecules, between these three sets of molecules, then arrange themselves so as to gradually change their orientation (bending) between the three boundaries. Hence the term 'bend cell' for such a configuration. Examples of bend cells are described by C. L. Kuo et al. in Appl. Phys. Letters vol. 68 March 1996 pp. 1461–1463, and by T. Miyashita et al. in Jpn. Jour. Appl. Phys. vol. 34 Feb. 1995 pp. L177–L179.

In addition to being capable of rotating the plane of polarization, as in a TN structure, liquid crystals are also birefringent. This means that for a plane polarized wave of light there are different refractive indices for the two components of the electric vector. As a result, after passing through a given thickness of a bi-refringent layer, the phase difference between these components (normally 0) changes, resulting in an elliptically polarized wave.

After passing through the exit polarizer 2, said elliptically polarized light is converted once more to plane polarized light. However, its intensity will have been changed, depending on the value of the afore-mentioned phase change which can be modified by varying the voltage applied across the liquid crystal molecules.

To view a display of the type illustrated in FIG. 1, light may be applied from above the entrance polarizer, and viewed from below the exit polarizer or a reflecting surface may be applied to the lower surface of exit 2 polarizer and the device viewed from above.

In general, color LCDs are built in the same way as monochrome LCDs except that their light has been passed through color filters. The latter comprise a matrix of sub-pixel size regions, such as 7, 8, or 9 in FIG. 1, on common substrate 3, each region being a tiny single filter. The spatial locations of the different colored regions are known to the liquid crystal display control system which determines the amount of light that is allowed to pass beyond any given dot, thereby creating a color image. For example, in FIG. 1, region 7 might represent a green filter, region 9 a blue filter, and region 8 a red filter.

One of the ways in which multicolor filters are manufactured is by using a light sensitive resin (such as a methacrylate polymer) as the material out of which the aforementioned dots are formed. Such a resin can be made to serve as a light filtering medium by dispersing an appropriate pigment within it. Then, by using a mask when exposing such a resin to the appropriate actinic radiation, any desired pattern of sub-pixel-sized regions of a given color can be produced.

A commonly incorporated feature of LCDs is a black matrix, (not shown in FIG. 1). Its purpose is to block light that reaches layer 2 without having passed through the open space between color filters. Such light is extraneous to the display and reduces the overall contrast.

Besides changing the overall brightness of the display, there is a more serious problem associated with the birefringent phenomenon, as described above. The magnitude of the phase change varies with wavelength so that the relative intensities of the emerging colors differ from that of the original image. This dispersive effect is particularly noticeable with respect to light that was intended to appear white but, instead, appears slightly colored.

A partial solution to this problem has been described in U.S. Pat. No. 5,136,405 (Wada et al. Aug 1992) and U.S. Pat. No. 5,380,459 (Kanemoto et al. Jan 1995). These patents teach the use of a single (macro) compensator comprising a sheet of bi-refringent material (11 in FIG. 1) that introduces additional phase changes, for the purpose of cancelling out those introduced by the liquid crystal. Unfortunately, the dispersion of the macrocompensator material cannot be matched exactly to that of the liquid crystal so exact cancellation of the color distortion introduced by the liquid crystal is not possible with a macrocompensator and a conventionally designed liquid crystal display.

An attempt to match the dispersion of the liquid crystal layer to that of a macrocompensator has been described by Haim et al. in U.S. Pat. No. 5,402,141 (Mar 1995). Haim's approach is to modify the dimensions of the cell gaps within the display itself so that the phase changes that are introduced are better suited to correction by a macrocompensator. As will be seen, this approach is quite different from that of the present invention.

SUMMARY OF THE INVENTION

It has been an object of the present invention to provide a color Liquid Crystal Display wherein a true color balance is seen for the full visible spectrum.

A further object of the present invention has been that said full spectral range color balance be seen for all viewing angles.

Yet another object of the present invention has been that said full spectral range color balance be seen for all voltages applied across the liquid crystal layer of the display.

An additional object of the present invention has been to provide several different structures, all of which meet the aforementioned objects.

A still further object of the present invention has been to provide a cost effective method for manufacturing the aforementioned structures.

These objects have been achieved by providing a separate set of microcompensators for each primary color that comprises the display. By this means, an exact match between the color distortion introduced by the liquid crystal layer and the phase compensation needed to correct this can be made for each primary color separately. Several different arrangements of the micro color filters of the display and their corresponding micro-compensators are shown and a cost effective method for manufacturing these structures is described.

BRIEF DESCRIPTION OF THE DRAWINGS

FIG. 1 is cross-section through a color Liquid Crystal Display of the prior art, including a single macrocompensator for improving color balance.

FIGS. 2 through 5 show different embodiments of the present invention, featuring individual microcompensators for the different colors.

DESCRIPTION OF THE PREFERRED EMBODIMENTS

Figure 3:
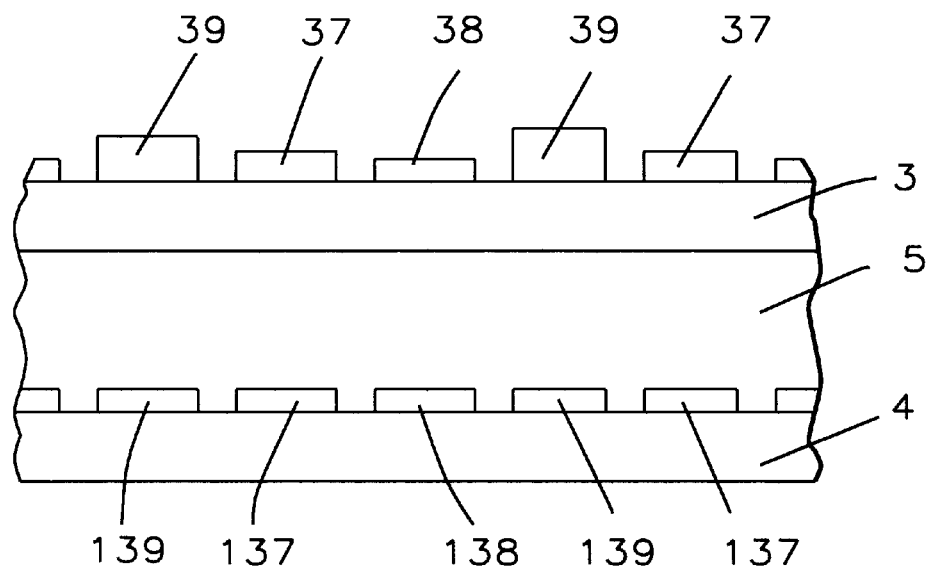

As already discussed, birefringent materials such as liquid crystals have different refractive indices for the two components of a plane-polarized light wave. Furthermore, said refractive indices vary with wavelength in a manner that differs from one material to the next so that exact compensation for the dispersive effects of the liquid crystal is not possible with a compensator that comprises a single material and thickness.

The approach taken by the present invention is to provide each sub-pixel (and hence each color of the display) with its own individual microcompensator. The composition and thickness of each microcompensator can then be tailored to provide exactly the degree of compensation needed for that color alone.

Referring now to FIG. 2, we illustrate there a first embodiment of the present invention. Those portions of the figure that are not novel continue to be designated with the same numbers as were used in FIG. 1. Microcompensators 17, 18, and 19, designed to compensate for phase changes in red, green, and blue light, respectively, have been deposited on the lower (inward-looking) surface of substrate 3. Said microcompensators comprise one or more materials taken from the group consisting of polycarbonates, polyethyleneterphthalate, polyvinyl alcohol, polysulphones, and polyimides, and will have thicknesses that differ one from another, but are in the range of from about 1 micron to about 100 microns.

The first set of microcompensators (for example 19) is formed by the application of material to the surface of 3, by means of spin-coating (at between about 500 and 2,000 RPM), to the desired thickness level, followed by baking at a temperature between about 25 and 120° C. for between about 5 and 10 minutes in an atmosphere of air. A light sensitive resin (such as methacrylate polymer), within which has been dispersed a colored pigment (chosen to match the phase change of the micro-compensator on which it has been deposited), is then applied, also by spin-coating, to a thickness of between about 0.5 and 10 microns. Said resin layer is now exposed, through a suitable mask, and developed, leaving behind sub-pixel-sized areas of resin 27, 28, and 29.

An etchant which does not attack the developed resin is now used to remove all birefringent material not covered by resin. The assemblage is then given a second heat treatment at a temperature between about 25 and 120° C. for between about 5 and 10 minutes in an atmosphere of air. Subsequent sets of microcompensator/color resin pairs are then formed by repeating the above steps with appropriate changes in material thickness and/or composition. Following the above steps, the structure has the appearance shown in FIG. 2.

Note the presence of macrocompensator 11 in FIG. 2. The incorporation of a macrocompensator, in addition to the microcompensators 17, 18, and 19 is not essential for the effective operation of the present invention but is optional. If used, its purpose would be to reduce the degree of phase change that would need to be provided by the microcompensators.

A second embodiment of the present invention is shown in schematic cross-section in FIG. 3. For simplification purposes, a number of standard components that form part of the complete Liquid Crystal Display, that were shown in FIGS. 1 and 2, are no longer shown here. These include the crossed polarizers, the field generating layers, and the optional macrocompensator. FIG. 2 illustrates that the microcompensators do not have to be in physical contact with the color filters and may even be located on different substrates.

In FIG. 3, microcompensators 37, 38, and 39 reside on the upper (outward-looking) surface of substrate 3 while color filters 137, 138, and 139 reside on the upper (inward-looking) surface of substrate 4. All that is required is that emerging light that passes through the color filters also passes through the microcompensators. This structure offers the advantage that microcompensators and color filters may be prepared in parallel, rather than serial, processes and the disadvantage that a separate photoresist step will be needed for the formation of the microcompensators. Additionally, the upper and lower substrates will need to be carefully aligned during assembly of the full display.

Figure 4:
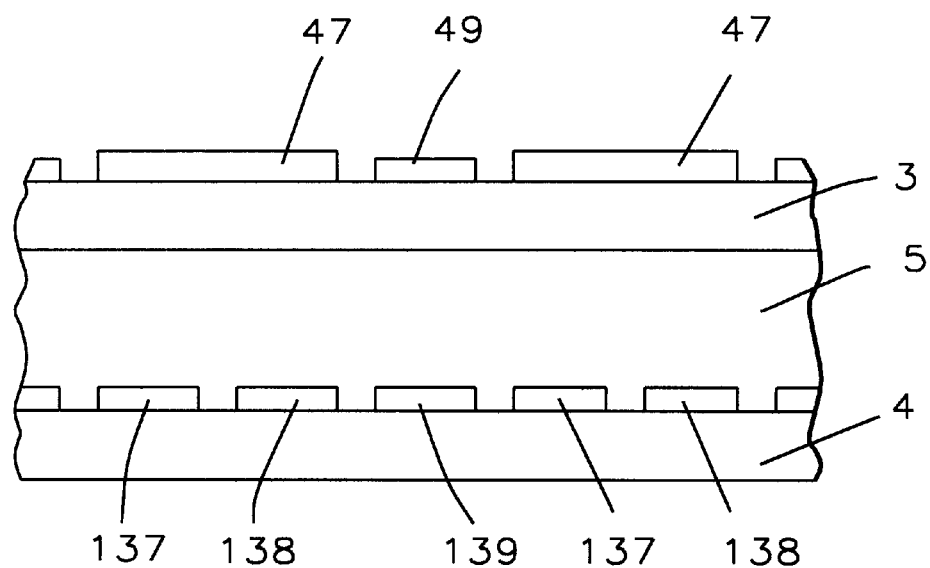

FIG. 4 illustrates a third embodiment of the present invention wherein two of the colors (passing through filters 137 and 138) share a common microcompensator 47 while light passing through filter 139 continues to have its own micro-compensator 49. In practice, the preferred application of this embodiment would be for red and green light to share a micro-compensator, with blue light having its own. The advantage of this structure is that fewer manufacturing steps would be needed.

Figure 5:
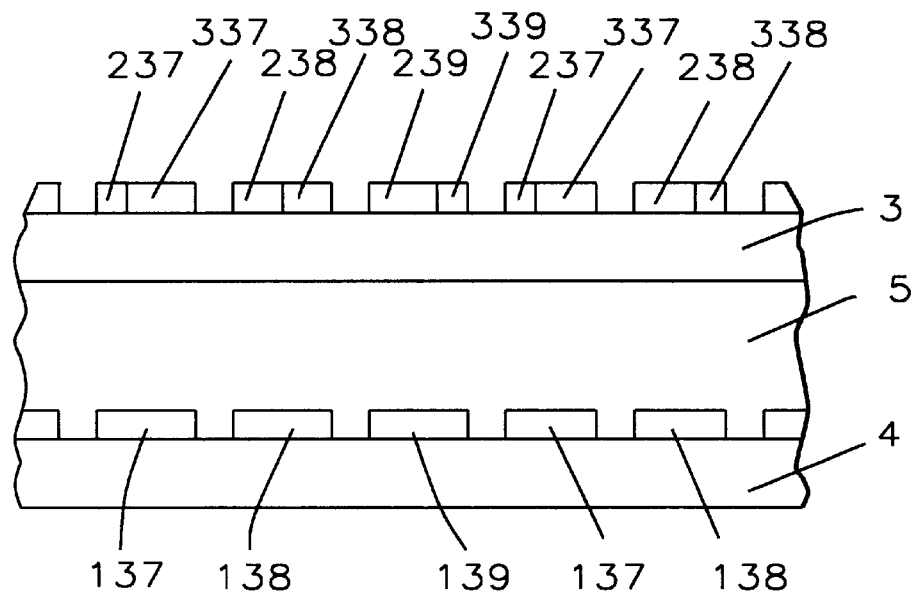
Figure 6:
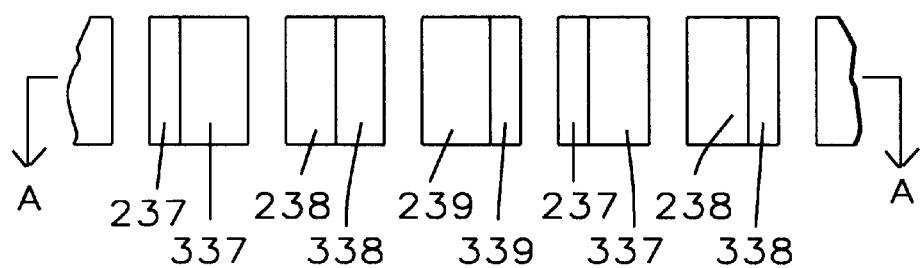
FIG. 6 is a plan view of FIG. 5.

A fourth embodiment is shown in FIG. 5. Each color has its own microcompensator but each of the latter now comprises two adjacent regions. Said regions may be of different thickness, different material, or both. Because the size of a micro-compensator is well within the resolution of the human eye, the light transmittance provided by each region separately is averaged out by the eye, in proportion to the relative areas of the two regions. Thus, through correct choice of the relative areas of the two regions, a multiplicity of different microcompensators may be formed while using only a two-step process. FIG. 6 is a plan view in which cross-section AA comprises FIG. 5.

Figure 7:
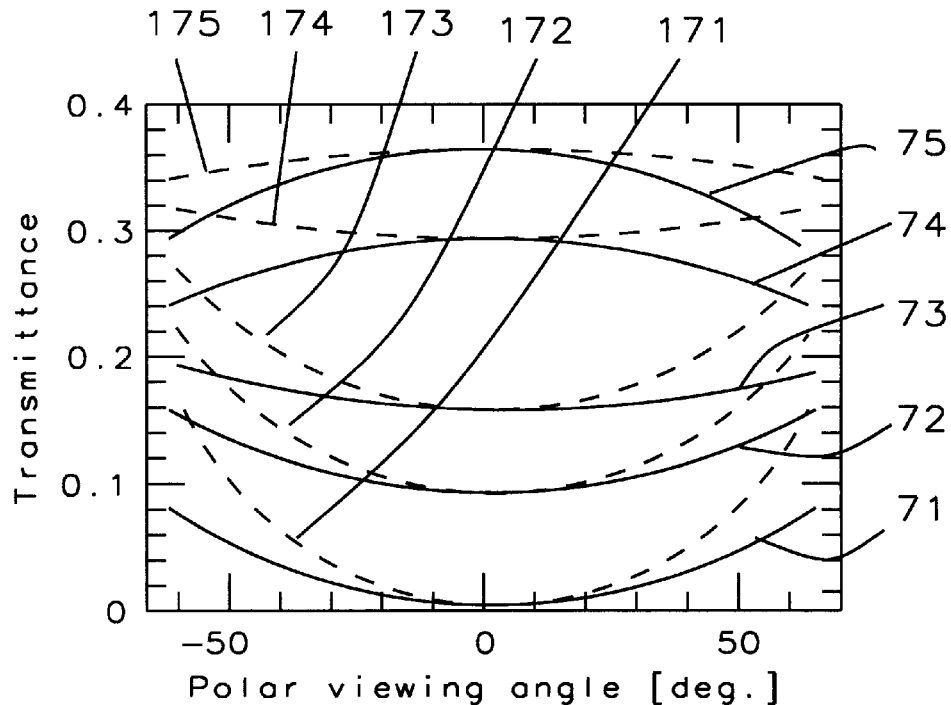
FIG. 7 is a series of curves showing transmittance of green and blue light vs. viewing angle for a display of the prior art.

The effectiveness of the present invention is illustrated by the following example:

FIG. 7 represents typical transmittance vs. polar viewing angle data for blue and green light in which a single (macro) compensator, associated with a bend cell, was used. Curves 71 through 75 are for green light in which the voltages applied across the liquid crystal layer were 5.98, 2.84, 2.30, 1.90, and 1.42 volts respectively, while broken curves 171 through 175 are for blue light in which the voltages were 5.98, 3.23, 2.68, 2.25, and 1.66 volts respectively.

Figure 8:
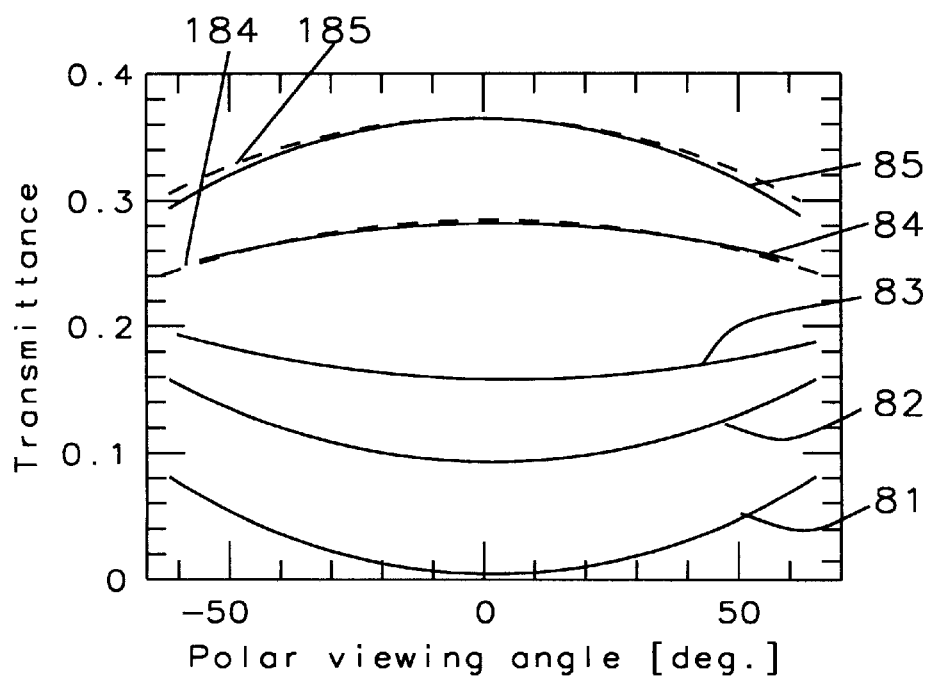
FIG. 8 is a series of curves showing transmittance of green and blue light vs. viewing angle for a display based on the present invention.

FIG. 8 represents transmittance vs. polar viewing angle data which we obtained by simulation for blue and green light in which each color had its own microcompensator. Curves 81 through 85 are for green light in which the voltages applied across the liquid crystal layer were 5.98, 2.84, 2.30, 1.90, and 1.42 volts respectively, while broken curves 184 and 185 are for blue light (2.25 and 1.66 volts respectively). Curves for blue light for the three lower voltages were too close to the green light curves to be distinguished in the figure. As can be seen, the improvement associated with the use of microcompensators in place of a macrocompensator are considerable.

While the invention has been particularly shown and described with reference to these preferred embodiments, it will be understood by those skilled in the art that various changes in form and details may be made without departing from the spirit and scope of the invention.

What is claimed is:

1. A liquid crystal display comprising:

crossed polarizers;

upper and lower substrates, each having inward-looking and outward-looking surfaces, between said crossed polarizers;

an array of sub-pixel-sized microcompensators, providing phase correction for red, green, and blue light, on an inward-looking surface of one of the substrates;

sub-pixel-sized red, green, and blue filters on said red, green, and blue microcompensators respectively;

a layer of transparent, electrically conductive, material over one of said inward-looking surfaces;

means, over the other inward-looking surface, for applying an electric field normal to any one of said color filters;

orientation layers over said field application means and over said layer of transparent conductive material; and a layer of liquid crystal between said orientation layers.

2. The structure of claim 1 further comprising a macrocompensator, located between the polarizer and the substrate, in addition to said microcompensators.

3. The structure of claim 1 wherein said microcompensators comprise material taken from the group consisting of polycarbonates, polyethylene-terphthalate, polyvinyl alcohol, polysulfones, and polyimides.

* * * * *